Patented July 18, 1939

2,166,844

UNITED STATES PATENT OFFICE 2,166,844

METAL ALLOY

Vincent T. Malcolm, Indian Orchard, Mass., assignor to The Chapman Valve Mfg. Co., Indian Orchard, Mass., a corporation of Massachusetts No Drawing. Application October 20, 1937, Serial No. 170,024

1 Claim. (Cl. 75—126)

This invention relates to improvements in metal alloys and is directed more particularly to the provision of alloys which are adapted to withstand certain chemical reactions and specifically to withstand conditions to which equipment in the oil industry is subjected.

That is to say, the alloys of this invention are particularly adapted to withstand conditions to which equipment which includes high-pressure steam and oil lines is subjected. Also, oil refinery equipment which is subjected to corrosive sulfur-containing liquids and gases and to high temperatures and pressures and valves and fittings for pipe-lines, and the like.

The principal object of the invention is to provide an alloy which not only is resistant to oxidation, corrosion and scaling but which is not unfavorably affected by the action of hydrogen-sulphide and relatively high temperatures such as, for instance, temperatures in the neighborhood of 1200 degrees Fah.

The alloy of the invention is adapted for general application but has been found to be particularly well adapted for use in the manufacture of pipe-line valves of all kinds and parts therefor. Valves in high-pressure steam and oil lines are used under various conditions and high temperatures and are therefore subjected to the deteriorating effects of heat and various chemical and physical reactions. It is to withstand these reactions that the alloy of the invention more particularly relates.

I have discovered that valves and the like which are made of the metal alloy of this invention are more capable of withstanding these certain chemical reactions, to which they are subjected in service, than are valves made from other materials heretofore known.

In accordance with the novel features of the invention, iron and certain other constituents are alloyed with chromium, tungsten and silicon. I have found that these constituents, together with carbon, when combined in certain critical proportions, coact to produce a new material or alloy which has unusual and unexpected characteristics and properties. That is, the alloy of my invention resists corrosion, scaling, and deterioration at high temperatures and pressures; it maintains high tensile strength and low creep at elevated temperatures, and it is resistant to attack of corrosive gases, such as those containing sulphur compounds, for example.

The alloy of the invention comprises the constituents hereinafter more fully set forth. These in a broad way are as follows:

| | Per cent |
|---|---|
| Chromium | 8. to 10. |
| Silicon | 1. to 2. |
| Tungsten | 1.5 to 1.75 |
| Carbon | .15 to .50 |
| Manganese | .40 to .60 |
| Phosphorus | .05 maximum |
| Sulphur | .05 maximum |
| Molybdenum | .5 to .70 |

In some cases it may be desirable to employ tungsten from .5 to .7 per cent and to employ molybdenum from 1.5 to 1.75 per cent.

An alloy made in accordance with the foregoing formula, when made into valves and parts thereof, has been found to have not only great resistance to the corrosive action of hydrogen sulphide gas, but is also well adapted to resist scaling and the unfavorable effects of relatively high temperatures, or temperatures in the neighborhood of 1200 degrees Fah.

As previously stated, metals used for the manufacture of valves and parts thereof are likely in service to be subjected to various unfavorable conditions, and an alloy including chromium, silicon, and tungsten in the proportions mentioned is well adapted to withstand these most severe conditions.

For instance, I have found that valves made from the above-described alloy and used in high pressure steam and oil lines, where the temperature was in the neighborhood of 1200 degrees Fah., were not unfavorably affected and although the metal was subjected to the usual chemical reactions which would ordinarily bring about corrosion, scaling and the like, the valves were much more serviceable than valves made from metals heretofore known.

I believe that I am the first to recognize the fact that by the use of the elements mentioned, it is possible to provide a metal alloy which is particularly suitable for manufacturing into valves, parts thereof, etc., inasmuch as it is not likely to be adversely affected when subjected to conditions which ordinarily result in corrosion, scaling, etc. It is desired to point out that while I have mentioned valves as one use for which the alloy is adapted, it will be found equally desirable wherever it is desired to use metal which will withstand, or at least effectively resist, corrosion, scaling and the unfavorable effects of the relatively high temperatures and conditions mentioned.

While I have described the invention in the form at present preferred, what I now desire to claim and secure by Letters Patent of the United States is:

As a new product, an alloy steel of high creep strength resistant to the action of gases and acids at high temperatures and pressures including, from 8 to 10% chromium, from 1 to 2% silicon, from 1.5 to 1.75% tungsten, from .15 to .50% carbon, from .40 to .60% manganese, from .50 to .70% molybdenum, from trace to .05% phosphorus, from trace to .05% sulphur, and the balance iron.

VINCENT T. MALCOLM.